United States Patent [19]

Schwerzel et al.

[11] 4,004,571

[45] Jan. 25, 1977

[54] ISOMERIZATION FOR PHOTOCHEMICAL SOLAR ENERGY STORAGE

[75] Inventors: Robert E. Schwerzel; Richard A. Nathan, both of Columbus, Ohio

[73] Assignee: Battelle Development Corporation, Columbus, Ohio

[22] Filed: June 30, 1975

[21] Appl. No.: 592,030

[52] U.S. Cl. .............................. 126/270; 126/400; 204/158 R
[51] Int. Cl.² ........................ F24J 3/02; F24H 7/00
[58] Field of Search ................ 204/158 R; 126/270, 126/271, 400

[56] References Cited

UNITED STATES PATENTS

| | | | |
|---|---|---|---|
| 2,677,664 | 5/1954 | Telkes | 126/270 C |
| 3,957,030 | 5/1976 | Davis | 126/270 |

*Primary Examiner*—Howard S. Williams
*Attorney, Agent, or Firm*—Kenneth R. Warburton

[57] ABSTRACT

An invention relating to photochemical collection, storage, and retrieval of solar energy through exposing to solar energy in the visible light spectrum of a photochemical valence isomerizable composition for a time converting a significant portion thereof to an intramolecular strained ring structure of higher energy content, retaining the higher energy content intramolecular strained ring structure until energy release is desired therefrom, and subsequently initiating conversion of the higher energy content intramolecular strained ring structure to its initial molecular structure through application of heat and/or catalyst thereto with a resultant exothermic conversion releasing heat in excess of that requisite for initiating and continuing the conversion and with the heat in excess thereof available for useful thermal applications; in the preferred method embodiment employing an organic valence isomerizable compound of a structure which includes two reactive carbon-to-carbon double bonds oriented in relation to each other such as to cyclize intramolecularly to the intramolecular strained ring structure upon exposure to solar radiation of a wavelength between 350 and 800 nm through the employed valence isomerizable compound including in its structure at least one chromophoric moiety from the group consisting of dihydroparaquinone moieties, orthoquinone moiety, trans- and cis-β-aminoenone moieties, and moiety mixtures thereof with inclusion of said moieties in an amount providing maximum light absorbance between 350 and 800 nm for said valence isomerizable compound; and various novel compounds employed in the preferred method.

5 Claims, No Drawings

ISOMERIZATION FOR PHOTOCHEMICAL SOLAR ENERGY STORAGE

This invention relates to photochemical collection, storage, and retrieval of solar energy through employment of a photochemical valence isomerizable composition. More particularly, the invention concerns novel valence isomerizable compounds, and concerns their employment in a solar energy collection and retrieval process wherein a lower energy level molecular form (isomer) of the valence isomerizable compound is exposed to solar radiation for conversion by the solar radiation to a higher energy level molecular form (isomer) (e.g., into a molecule containing a strained ring system structure) which subsequently upon demand by thermal activation thereof regenerates its lower energy level molecular form with exothermic release of energy in excess of that required for its thermal activation and continued conversion and with this excess amount of released energy available for useful energy applications and purposes.

BACKGROUND

The use of sunlight (i.e., solar energy) to supply human needs for energy is of prime importance in view of man's gradual depletion of more conventional energy sources such as fossil fuels of coal, oil, and the like.

Prior Art

One known approach to solar energy collection and utilization, termed herein a "conventional" thermal solar energy system, is based upon the heat produced when a blackened surface is exposed to sunlight. Such a system utilizes a collector, in which a sheet of blackened metal serves to heat a working fluid, typically air, water, or water-glycol mixtures. In such a system, the working fluid, e.g., water, is circulated through the collector (often over the plate or through tubes or the like affixed to the back side of a blackened plate collector) causing the fluid to absorb sensible heat (rise in temperature). There are, of course, many modifications possible to such a system, but in the simplest the hot fluid then is stored in an "energy storage tank" where it is held until the energy is needed for heating or cooling purposes. At that time the hot fluid can be drawn off to run an air conditioning or heating system. During this heating or cooling process, the fluid loses much or all of its sensible heat energy and then is recirculated to the collector to pick up additional energy. The simplicity, safety, and potentially low operating cost of thermal solar energy systems have already led to the commercial installation of prototype systems for applications, such as the heating of water, in some locations throughout the world.

However, a number of problems and disadvantages are inherent in a conventional thermal solar energy system. Maximum instantaneous efficiency of present-day flat-plate collectors is only about 40 percent. More realistically, an average daily collection efficiency on a sunny day might approach 20 percent, primarily because of optical and thermal losses. Additionally, a serious limitation to the thermal system is that the system can operate effectively only so long as there is appreciable sunlight. That is, in a thermal solar energy system there is a threshold value of light necessary before the system can be put in use. Furthermore, a thermal system will incorporate some type of short-term heat storage such as heated water, rock, or eutectic salt mixtures to smooth out the operation of the system during the night and during cloudy periods. The cost of the thermal system, including principally the cost of the collector and insulated storage, is such that it is impractical to store more heat in this way than can operate a building's heating and cooling system for a period between several hours and a few days. As a result, there are drawbacks with thermal systems which have to operate throughout the winter in the highly populated temperate-zone climates more distant from the equator, where there is both cold weather and considerable cloud cover. The collector must heat up to an operating temperature before the system can be turned on. Even on bright winter days in such climates, the system might be usable for only 2 or 3 hours each day. On cold, cloudy days, it is doubtful that a thermal solar energy system could be used at all. During such periods when the thermal solar energy system is unable to operate, an auxiliary energy source (e.g., electricity) needs to be available and used to supply energy for a consumer system's needs.

Other approaches taught for solar energy collection and utilization have sought to employ various principles and means, such as thermoelectric conversion based on solar heating of one junction of a thermocouple of dissimilar metals (Seeback principle), and photovoltaic conversion of solar radiation directly to electrical power to photovoltaic cells. These approaches also have limitations and disadvantages, a principal one that of being much too expensive for general use.

Photochemical conversion of solar radiation is another approach for converting solar energy into useful work. Biological photochemical processes occur naturally and are well illustrated by photosynthesis in providing organic plants. Non-biological photochemical conversions also are found to some extent in nature and also have been investigated to some extent for a controlled converting and supplying of energy needs from solar energy. The photochemical approaches include the effects of solar energy on molecular dissociation, rearrangement, or chemical reaction, or the like. Such photochemical processes and conversion are described by J. G. Calvert in "Photochemical Processes for Utilization of Solar Energy," pages 190–210, in *Introduction to the Utilization of Solar Energy*, edited by A. M. Zarem and D. D. Erway, McGraw-Hill, New York, 1963, and by Farrington Daniels in Chapter 17, "Photochemical Conversion," pages 299–329, in *Direct Use of The Sun's Energy*, Yale University Press, New Haven and London, 1964. The last mentioned includes a teaching of: "There are no promising laboratory photochemical reactions now for storing and using solar energy; . . . ".

B. H. Clampitt and D. E. German, in SAE Journal, May, 1960, pages 52–54, "Solar-to-Electric Energy," describe a two-stage device for converting solar energy into electrical energy with the first stage involving solar-to-chemical energy through photochemical geometrical trans to cis isomerization of organic acids.

So far as is known valence isomerization has received little to no attention as a system for photochemical solar energy storage in that generally valence isomerizations are known only to proceed under the influence of wavelengths below about 400 nm and therefore would be quite inefficient for absorbing sunlight.

PRINCIPLES FOR PHOTOCHEMICAL SOLAR ENERGY COLLECTION AND RETRIEVAL

An attractive alterative to a thermal solar conversion and storage system is one in which the solar energy could be stored chemically, by means of a photochemical reaction which is reversible on demand as shown by the following reactions:

Energy Collection:

Photochemical and light → Stable High Energy Chemical(s)

Energy Release:

Stable High Energy Chemical(s) → Photochemical plus Heat

In principle, such a system can operate to some extent at any time during the daylight hours. As contrasted with the threshold behavior of thermal systems, the photochemical reaction will proceed so long as some light is present, although, of course, the extent of reaction increases with increasing sunlight. The system could be started immediately at sunrise without waiting for the collector to reach high temperature, and could be run continuously until sundown. Since by definition the photochemical reaction will produce a product(s) with a higher energy content than that of the starting material, some of this chemically stored energy can be used immediately, in conjunction with any sensible heat picked up by the material during passage through the collector. The remaining high energy product(s) which accumulates during the day can be held in a storage tank(s) until needed. In the instances where the collection step or reaction involves a chemical dissociation, the resulting dissociated products can be stored separately and upon being remixed caused to reassociate to provide the energy release. In other instances where the solar energy collection provides a single stable high energy chemical, one provides means, that is, radiation of a specific wave length or heat, to trigger energy release therefrom and regeneration of the starting photochemical. Fundamental considerations for a suitable photochemically active material are that it:

1. absorb as much of the solar spectrum as possible;
2. undergo an efficient photochemical reaction in the presence of sunlight to give a product(s) of higher energy content than the original material. Since this process provides the energy storage, it is desired to have the energy content of the product(s) as high as possible; and
3. be regenerated readily upon demand from the high energy product(s) with concurrent release of the stored energy as heat.
4. accomplish the above with little to no deterioration.

Valence isomerization defines a class of photochemical reactions characterized by a molecular structure (isomer) of the photochemical under the influence of radiation undergoing an internal cyclization to form a strained ring system molecular structure of higher energy content. (R. B. Woodward and R. Hoffman, "The Conservation of Orbital Symmetry," Academic Press, New York, 1970). Valence isomerization for photochemical solar energy collection, storage, and retrieval provides inherent advantages over other types of photochemical reactions. These advantages include:

a. The photochemical reaction is self-limiting, as the cyclization changes the absorption properties of the molecule so as to preclude photochemical back-reaction; and b. The energy storage capability which can in principle be attained is substantially larger than that for known geometrical isomerizations.

SUMMARY STATEMENT OF THE INVENTION

The present invention involves chemically modifying a valence isomerizable compound by incorporation into the compound of a quinone or $\beta$-aminoenone chromophore moiety so as to extend the compound's light absorbance into longer wavelengths, generally into those wavelengths corresponding to the wavelengths of most intense solar radiation, and with this chemical modification being without significant detriment to the compound's photochemical and thermal properties so as to provide the novel valence isomerizable compounds of the invention. The invention in particular includes employing a valence isomerizable compound, especially and preferably the novel valence isomerizable compounds of the invention, in a process for photochemical collection and retrieval of solar energy in a significant amount. More particularly, the invention's process comprises: exposing the valence isomerizable compound which is responsive to absorbed solar energy in the visible light spectrum (i.e., between 350 and 800 nm) to form by cyclization an intramolecular strained ring structure of higher energy content; storing and/or retaining the molecular structure of higher energy content until energy is desired therefrom; and thereafter by heat application thereto and/or catalyst causing the higher energy content molecular structure to convert exothermically back to its initial molecular structure of lower energy content with release of heat in an amount in excess of the heat applied to initiate and/or continue conversion to the lower energy content molecular structure and with the heat in excess thereof being available for useful thermal energy applications. A catalyst can be employed to initiate and facilitate the conversion back to the initial molecular structure at a lower temperature than would otherwise be possible. Generally the employed valence isomerizable compound is dissolved and/or dispersed in a liquid medium (preferably water or predominantly aqueous liquid medium, although organic media are useful) for the processes' procedural sequence of steps of exposure, storage, and conversion. Upon return of the valence isomerizable composition to its lower energy level molecular structure, the processes' procedural sequence of steps are repeatable.

DETAILED DESCRIPTION AND PREFERRED EMBODIMENTS

For purposes of the present invention, a valence isomerizable compound is an organic compound of a molecular structure which upon exposure to radiation undergoes an intramolecular cyclization to form a strained ring molecular structure of higher energy content. One can schematically illustrate molecular structures for two general types of valence isomerizable compounds as follows:

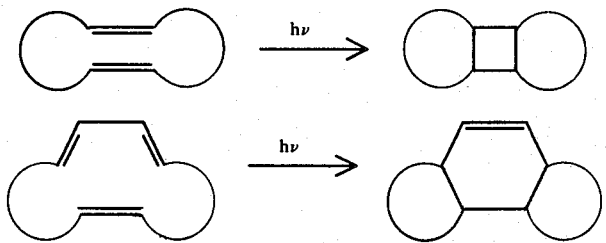

To present more specific illustrative examples of, and also as representative of, valence isomerizable compounds, the following are in literature: For these compounds there are included herein their estimated potential energy storage capabilities, which estimated energy storage values are those either reported in literature, or estimated by analogy to known related systems, or calculated by Benson's procedures (S. W. Benson, "Thermochemical Kinetics," John Wiley & Sons, Inc., New York (1968)).

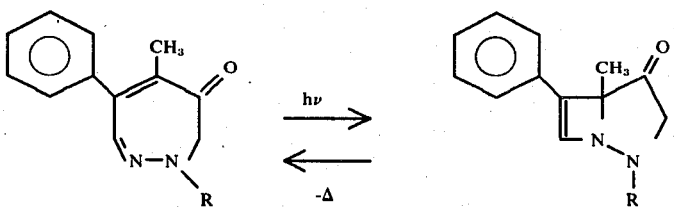

R = hydrogen, alkyl, aryl, alkoyl, or aroyl
Estimated Energy Storage: ca. 4–8 Kcal/mole

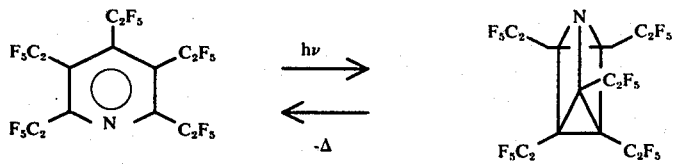

Estimated Energy Storage: ca. 60 Kcal/mole

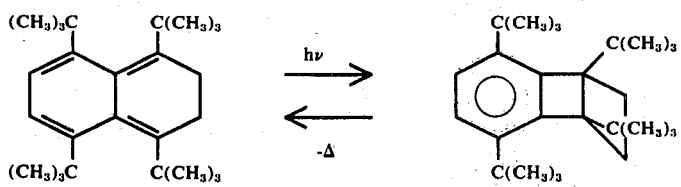

Estimated Energy Storage: ca. 30 Kcal/mole

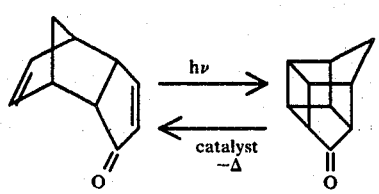

Estimated Energy Storage: ca. 16 Kcal/mole

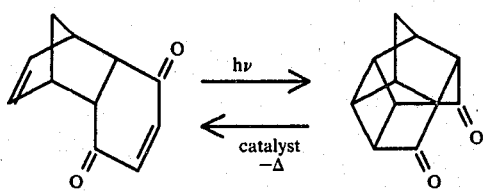

Estimated Energy Storage: ca. 10–15 Kcal/mole

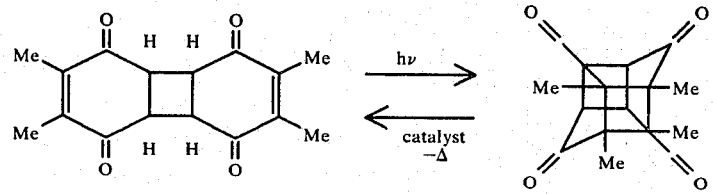

Estimated Energy Storage: ca. 10 Kcal/mole

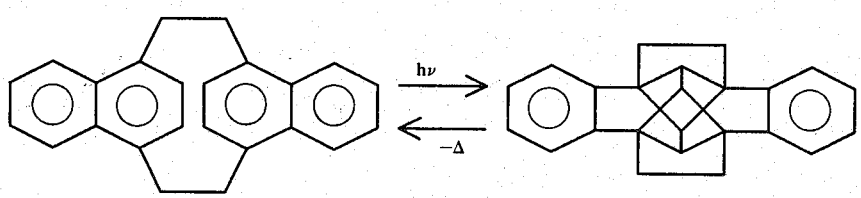

Estimated Energy Storage: ca. 20–30 Kcal/mole

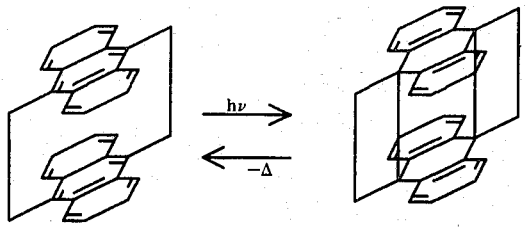

Estimated Energy Storage: ca. 5–10 Kcal/mole

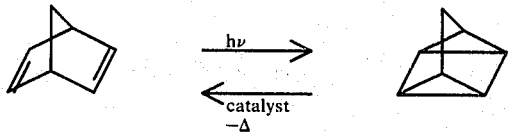

Estimated Energy Storage: ca. 20 Kcal/mole

As is apparent from art teachings of the foregoing valence isomerizable compounds, each of them per se are known to, and/or do, lack light absorbance maxima in the visible wavelengths and thus per se would be quite inefficient, if even operative at all, in the process of the invention. However, the present invention contemplates that such valence isomerizable compositions, which lack light absorbance maxima in the visible wavelengths, may be useful in the invention by employing the same in conjunction with a photosensitizer which functions to strongly absorb light in the visible wavelengths and then transfer some or all of the energy gained from the light absorption process to the valence isomerizable compound, thereby inducing the valence isomerization reaction to occur, so that the composition of such valence isomerizable compounds plus photochemical sensitizer will provide a photochemical composition exhibiting at least one light absorbance maximum in the visible wavelengths and providing the storage, conversion, and release as heat of solar energy by means of the sensitized valence isomerization.

More specifically and preferably, the present invention contemplates chemical modification of valence isomerizable compounds to shift their light absorbance maxima into the visible light wavelengths and thus more closely match the wavelengths of most intense solar radiation. The chemical modification contemplated is to incorporate into the valence isomerizable compound one or more of certain chromophoric moieties and then employ such modified valence isomerizable compounds in the invention's process. Thus, instead of using a physical mixture of a valence isomerizable compound lacking maximum absorbance in the visible wavelengths and a photosensitizer, the preferred invention employs a valence isomerizable compound internally modified through its structure being modified to incorporate therein certain quinone and/or $\beta$-aminoenone moieties. Additionally as an especially preferred embodiment of the invention, a photosensitizer may, if desired, be employed along with a preferred valence isomerizable compound.

For purposes of the present invention, the valence isomerizable compounds for preferred practice of the inventions are organic compounds, which are analogues and/or derivatives of known valence isomerizable compounds in that each includes in its molecular structure two reactive carbon-to-carbon double bounds, conjugated or unconjugated, oriented in such relation to each other than under irradiation there occurs an intramolecular cyclization to a strained ring molecular structure of higher energy content, and these valence isomerizable organic compounds include in their molecular structure at least one chromophoric moiety selected from the group consisting of dihydroparaquinone moieties, orthoquinone moiety, trans- and cis-$\beta$-aminoenone moieties, and mixtures thereof with inclusion of the foregoing moieties in an amount adapted to provide maximum light absorbance between 350 and 800 nm for the valence isomerizable compound. Structurally these moieties are illustrated as follows:

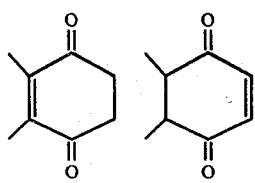

dihydroparaquinone moieties

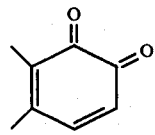

orthoquinone moiety

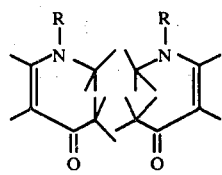

R = alkyl or aryl cis-β-aminoenone moieties

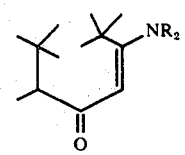

R = alkyl or aryl trans-β-aminoenone moiety

Illustrative examples of preparations of useful and preferred valence isomerizable compounds for preferred practice of the invention follow:

EXAMPLE I

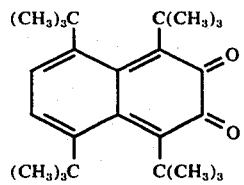

One stoichiometric equivalent of 1,4,5,8-tetra-t-butyl-naphthalene and one equivalent of osmium tetraoxide (OsO$_4$) in pyridine are stirred for several hours at room temperature (about 20°–25° C). A solution of excess sodium bisulfite (NaHSO$_3$) in pyridine and water is added with stirring. The resulting crude product is extracted with methylene chloride (H$_2$CCL$_2$) and is purified by chromatography on alumina. A resulting 1,4,5,8-tetra-t-butyl-2,3-dihydronaphthalene-2,3-diol is treated with excess copper sulfate (CuSO$_4$) in pyridine and water, is heated to 90° C for several hours, and then is cooled. The mixture is diluted with water and is extracted with an organic solvent (e.g., diethylether, chloroform, or methylene chloride). The solvent is evaporated and the crude product purified by chromatography on alumina to obtain 1,4,5,8-tetra-t-butyl-2,3-dihydronaphthalene-2,3-dione (1,4,5,8-tetra-t-butyl-2,3-naphthoquinone).

EXAMPLE II

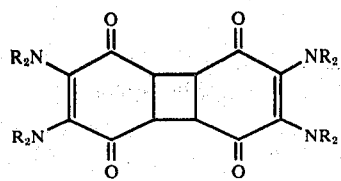

R = alkyl or aryl

One stoichiometric equivalent of 2,3-dichlorobenzoquinone is treated with excess dialkyl amine (e.g., diethylamine), in dimethyl sulfoxide and heated for several hours. The resulting solution is diluted and neutralized with 10 percent aqueous sodium carbonate, and then is extracted with ethyl acetate. The ethyl acetate solvent is removed by evaporation thereof and the resulting product is purified by chromatography on alumina. A 0.1 M solution of this product (i.e., the 2,3-dialkylaminoquinone) in ethyl acetate is irradiated with pyrex glass-filtered ultraviolet light from a medium pressure mercury arc lamp until TLC (thin-layer chromatography) shows no starting material remains. The ethyl acetate solvent is removed by evaporation under reduced pressure and the crude product is purified by chromatography on silica gel. The desired cis-syn-cis isomer of the quinone dimer (in which the four cyclobutyl hydrogen atoms are on the same side of the cyclobutane ring) is separated from any other products by means of this chromatography on silica gel procedure.

The preceding preparation is repeated except there is employed a diarylamine (e.g., bis-(4-methoxyphenyl)amine) in place of the dialkyl amine and there is produced the corresponding tetra(diarylamine)-product.

EXAMPLE III

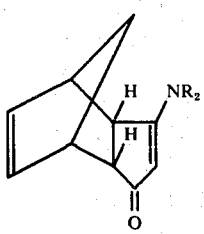

R = alkyl or aryl

One stoichiometric equivalent of cyclopentadienone and one stoichiometric equivalent of a dialkylamine (e.g., diethylamine) are dissolved in benzene and heated to reflux for several hours. The mixture is cooled, two equivalents of tetrachloroquinone (chloranil) are added, and the mixture heated again to reflux for several hours. The resulting solution is cooled, washed with 5 percent aqueous hydrochloric acid, followed by a water wash, dried over anhydrous sodium sulfate, and the benzene solvent then is evaporated therefrom. Chromatography over alumina is used to remove the oxidized chloranil and to purify the product, 3-dialkylamino-cyclopentadien-1-one. One equivalent of this product and one equivalent of cyclopentadiene are dissolved in benzene, placed in a sealed tube and heated to 100°–120° C for several hours. The tube is cooled, opened, and the benzene solvent evaporated. The crude product is purified by chromatography on alumina, so as to isolate the desired endo isomer of the product compound.

The preceding preparation is repeated except there is employed a diarylamine (e.g., bis-(4-methoxyphenyl)amine) in place of the dialkylamine and there is produced the corresponding arylamine product.

The following three syntheses are a modification of the procedures reported by Cram et al. (D. J. Cram, C. K. Dalton and G. R. Knox, *J. Am. Chem. Soc.*, 85, 1088 (1963) for the synthesis of unsubstituted [2.2] paracyclonaphthalene.

EXAMPLE IV

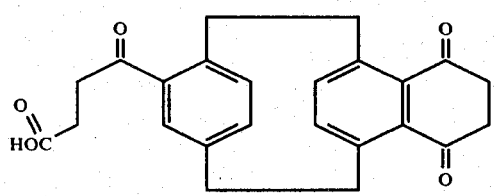

One stoichiometric equivalent of succinic anhydride is added to three stoichiometric equivalents of anhydrous aluminum chloride in dichloromethane which is cooled with an ice-NaCl bath. The mixture is stirred for about one-half hour and one stoichiometric equivalent of [2.2] paracyclophane, I, is added. The mixture is stirred and cooled for about another one-half hour, and then quenched with ice and hydrochloric acid. The resulting aqueous phase is extracted with dichloromethane; the solvent is evaporated; and a resulting intermediate product, II,β-(2-[2.2] paracyclophanecarbonyl) propionic acid, is purified by chromatography on silica gel using benzene and pentane eluents. This intermediate product, II, is placed in a polyethylene bottle and treated with excess hydrofluoric acid. The hydrofluoric acid is allowed to evaporate with gentle stirring. A resulting intermediate product, III, 2,3-quino-[2.2] paracyclophane, is dissolved in diethyl ether, is washed several times cautiously with saturated aqueous sodium bicarbonate, is dried and the diethyl ether is evaporated therefrom. This intermediate product is purified by chromatography on alumina. One equivalent of succinic anhydride is added to three equivalents of anhydrous aluminum chloride in dichloromethane cooled with an ice-NaCl bath. The mixture is stirred for one-half hour and one equivalent of the chromatographically-purified intermediate product III is added. The mixture is stirred for one-half hour and then quenched with ice and hydrochloric acid. The resulting aqueous phase is extracted with dichloromethane; the solvent is evaporated; and the product, IV, β-(2,3-quino-2′-[2,2] paracyclophanecarbonyl)-propionic acid, purified by chromatography on silica gel using benzene and pentane eluents.

EXAMPLE V

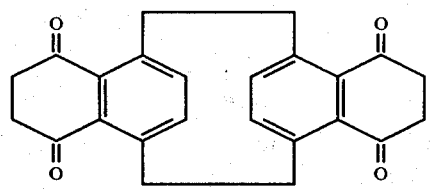

Product IV, β-(2,3-quino-2′-[2.2] paracyclophanecarbonyl) propionic acid, prepared and purified as in the preceding example, is placed in a polyethylene bottle and treated with excess hydrofluoric acid. The hydrofluoric acid is allowed to evaporate with gentle stirring and the resulting product is dissolved in diethyl ether, is washed several times with saturated aqueous sodium bicarbonate, is dried over anhydrous magnesium sulfate, and the diethyl ether is evaporated therefrom. The product, 2,3,2′,3′,-diquino[2.2] paracyclophane, V, is purified by chromatography on alumina.

EXAMPLE VI

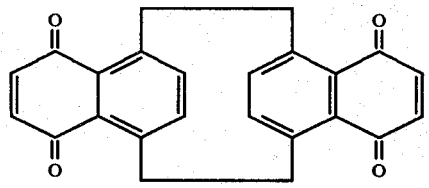

One equivalent of the product, V, 2,3,2′,3′-diquino[2.2]paracyclophane, prepared and purified as in the preceding example, is mixed with three equivalents of tetrachloroquinone (chloranil) in an aromatic hydrocarbon solvent (such as benzene) and refluxed for 24 hours. The mixture is cooled and diluted with pentane and filtered. The product, 5,8,5′,8′-tetraketo-1,4,1′,4′-naphtho-[2.2] cyclophane, VI, is collected on the filter and is chromatographed on alumina for purification.

An illustrative and representative preferred practice of the method of the invention is described below:

The valence isomerizable compounds, whose preparations are presented in the foregoing Examples I through VI are useful in the process of the invention. For example, a prepared valence isomerizable compound is exposed to solar radiation, including visible light radiation between 350 and 800 nm, while dissolved, dispersed, or both, in a liquid solvent therefore. The irradiated product resulting from this exposure generally is transparent, or nearly transparent, so as to be able to be retained in sunlight or darkness for at least one day without significant degradation or reversion to the starting material. After retaining for about one day of the product resulting from the exposure to solar radiation, this product is heated to an activation temperature sufficient to convert the irradiated product to its initial molecular structure with a release of heat observed in excess of the quantity of heat employed to bring the irradiated product to activation temperature. This excess of heat by means of a conventional heat-exchanger then is available for useful thermal energy applications. The regenerated compound having its initial molecular structure also then is available to be and is able to be recycled through the foregoing exposing, retaining and conversion steps.

We claim:

1. A process for photochemical collection, storage, and retrieval of solar energy, which process comprises the steps of:
   a. exposing a valence isomerizable compound, which is responsive to absorbing solar energy in the visible light spectrum while dissolved, dispersed, or both, in a liquid medium, to solar energy radiation for a time converting by means of an intramolecular cyclization a significant portion thereof to a strained ring structure of higher energy content;
   b. retaining the strained ring structure of higher energy content until energy release is desired therefrom; and
   c. heating the strained ring structure of higher energy content to a temperature initiating exothermal conversion thereof to its initial molecular structure with release of heat in excess of that requisite for initiating and continuing the conversion and with the heat in excess thereof available for useful thermal energy applications.

2. The process of claim 1 in which the initial molecular structure resulting from step (c) is recycled through steps (a), (b), and (c).

3. The process of claim 1 which includes during said exposing step (a) the exposing of the valence isomerizable compound in the presence of a photosensitizer adapted to strongly absorb light in the visible wavelengths and to transfer at least some energy gained from this absorption to the valence isomerizable compound.

4. The process of claim 1 in which a catalyst is included in the (c) heating step, said catalyst adapted to intitiate the exothermal conversion at a temperature lower than requisite in the absence of said catalyst.

5. The process of claim 1 employing therein the valence isomerizable compound which (a) includes in its molecular structure two reactive carbon-to-carbon double bonds having their orientation in relation to each other adapted to cyclize intramolecularly to the strained ring structure of higher energy content upon exposure to solar radiation of a wavelength between 350 and 800 nm, and (b) includes at least one chromopohoric moiety selected from the group consisting of dihydroparaquinone moieties, orthoquinone moiety; trans- and cis-$\beta$-aminoenone moieties, and mixtures thereof, and with inclusion in said structure of said moieties in an amount providing maximum light absorbance between 350 and 800 nm for said valence isomerizable compound.

* * * * *